Oct. 7, 1947.　　　　E. DUNKER　　　　2,428,517
TRACTOR COMBINE COMBINATION
Filed Sept. 9, 1943　　　5 Sheets-Sheet 1
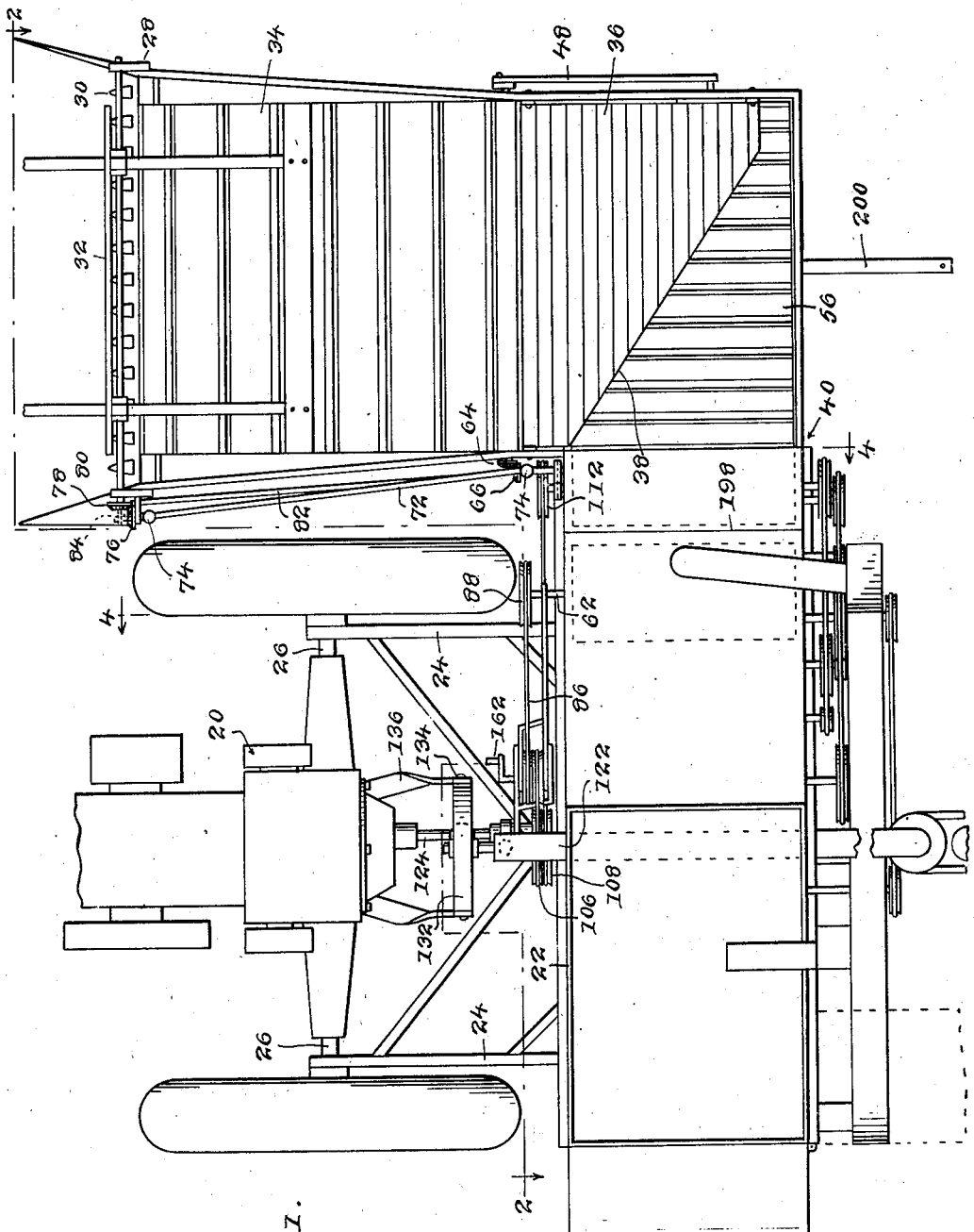
INVENTOR.
Erwin Dunker
BY
Victor J. Evans & Co.
ATTORNEYS

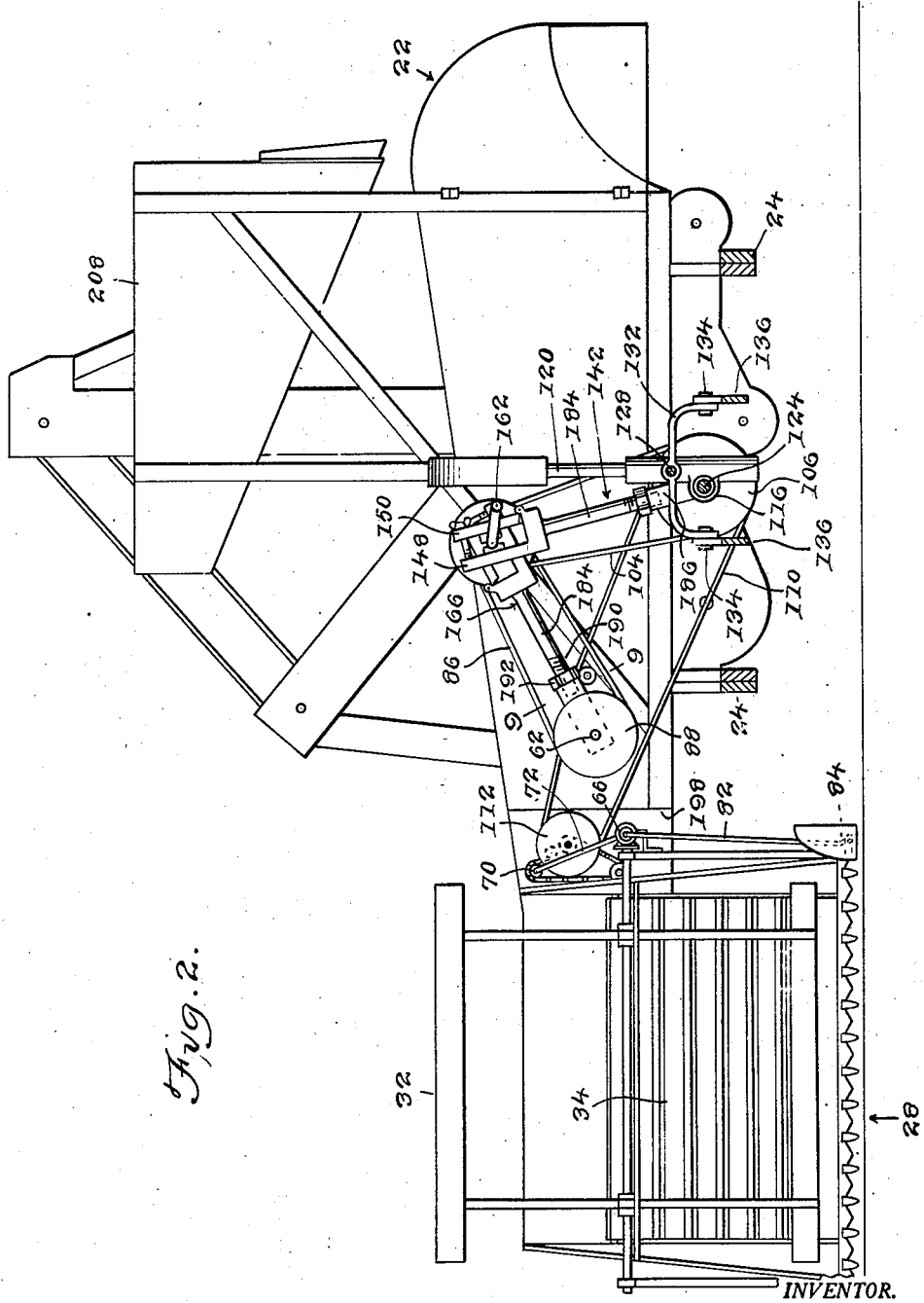

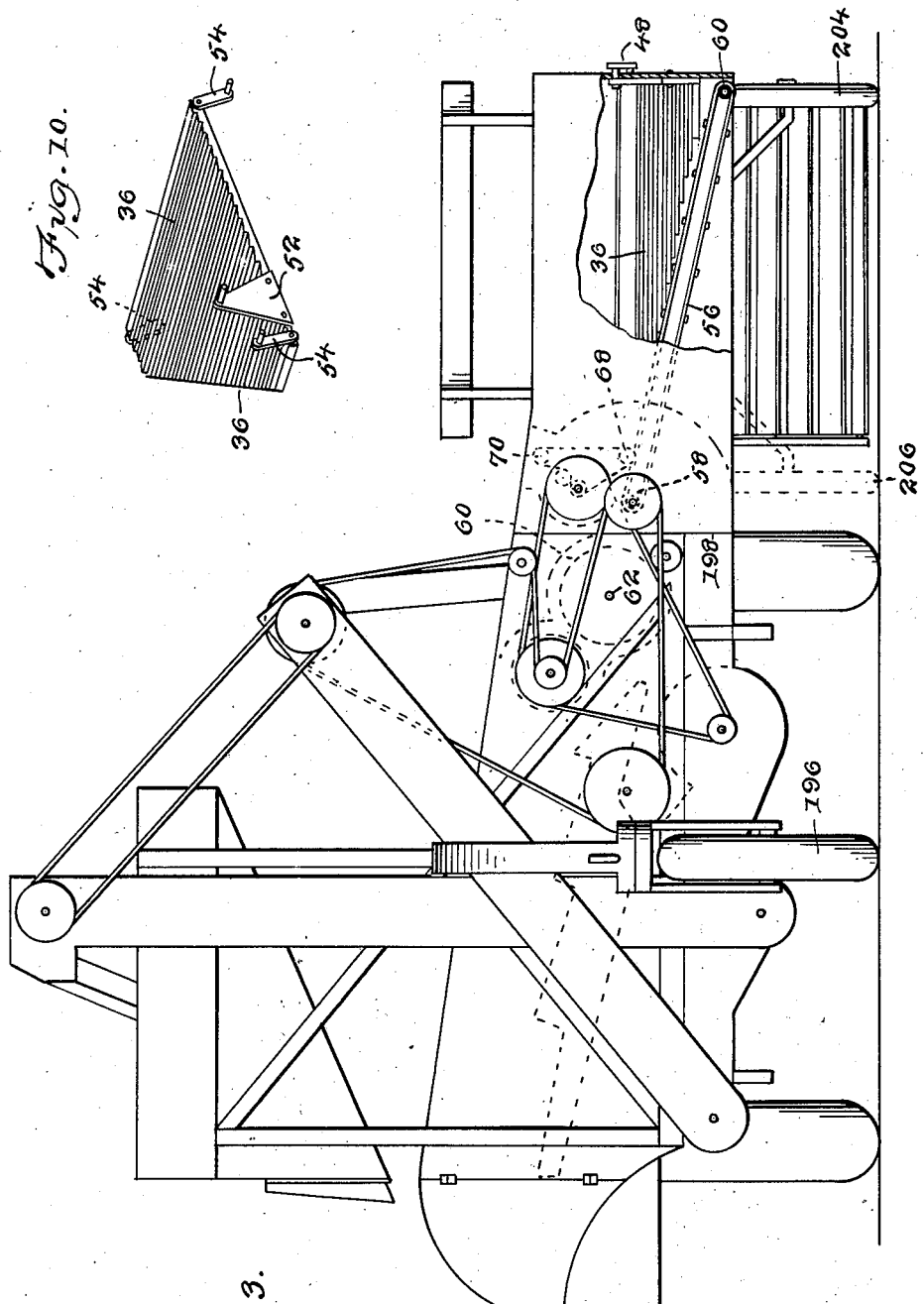

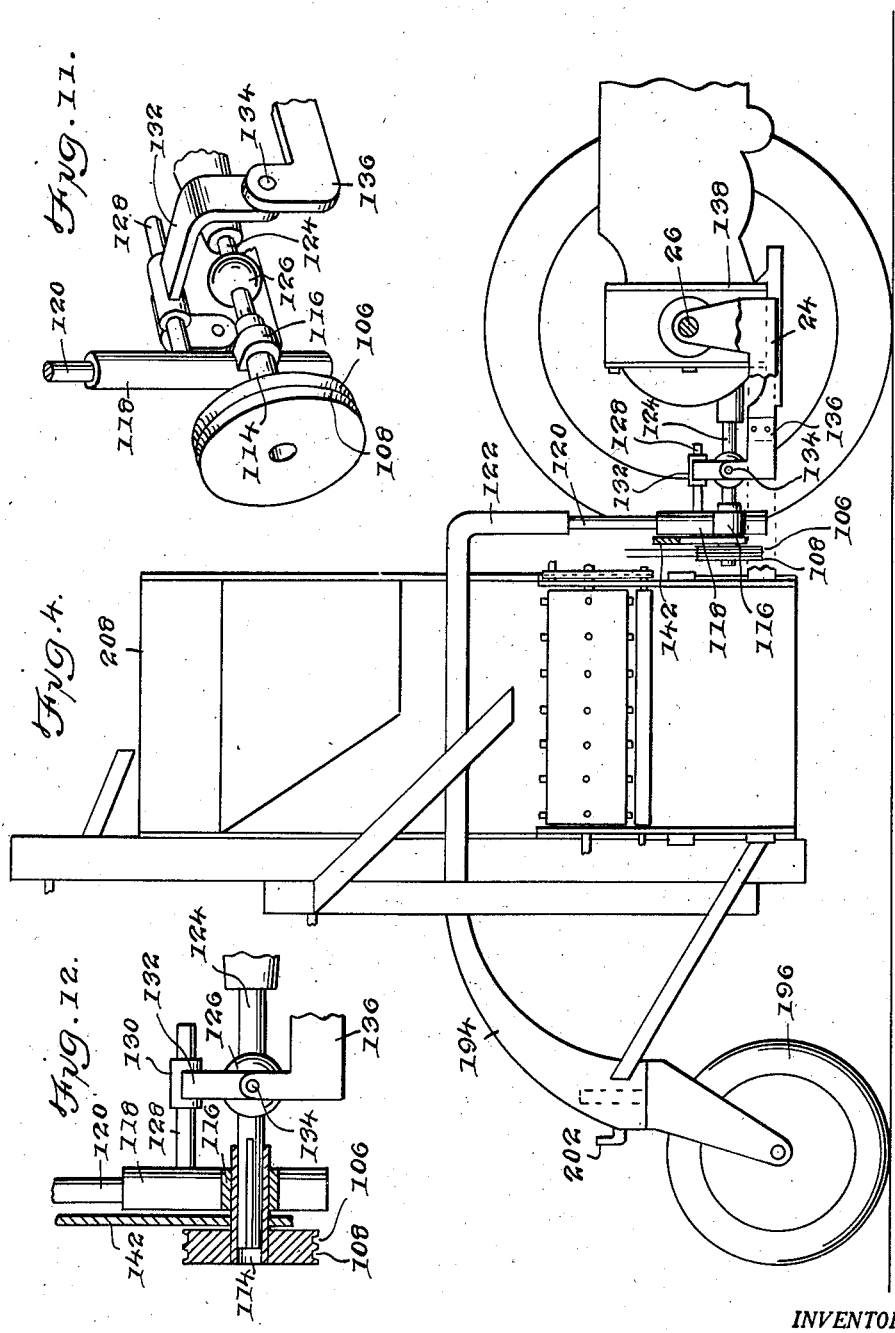

Oct. 7, 1947.  E. DUNKER  2,428,517
TRACTOR COMBINE COMBINATION
Filed Sept. 9, 1943  5 Sheets-Sheet 5
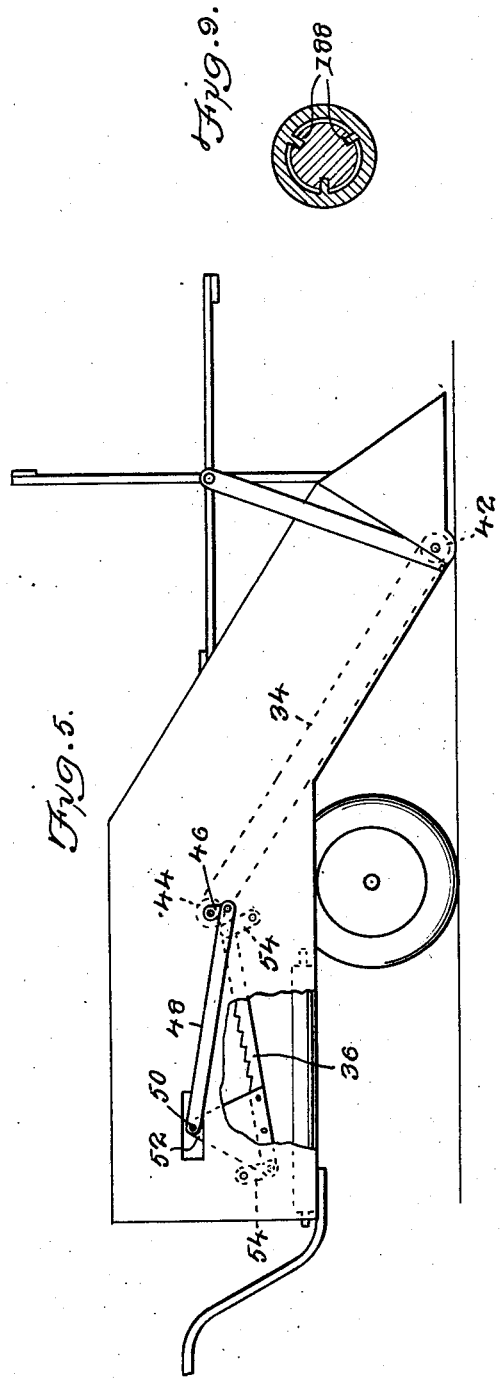
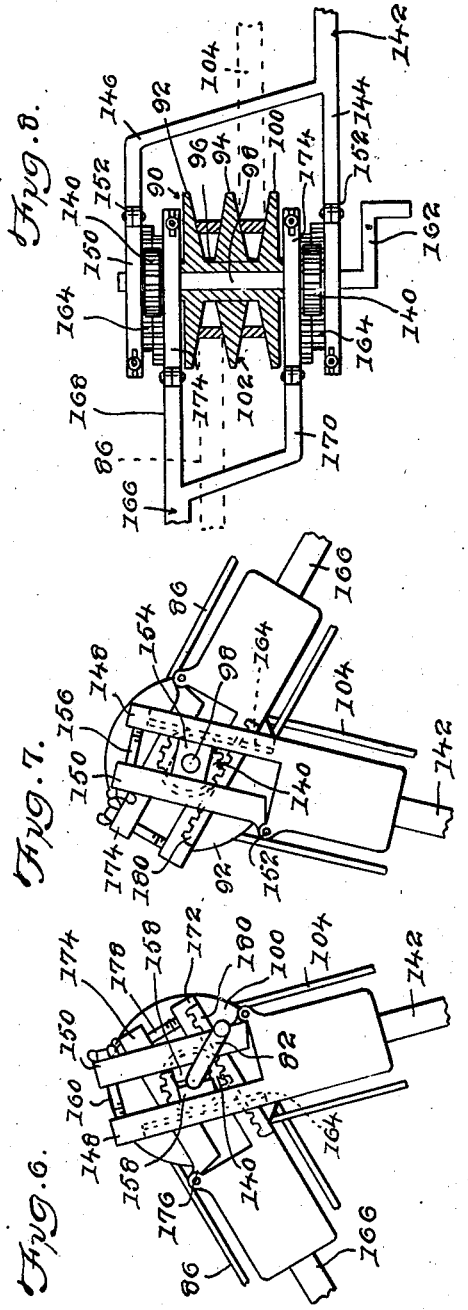
INVENTOR.
Erwin Dunker
BY
Victor J. Evans & Co.
ATTORNEYS Patented Oct. 7, 1947

2,428,517

UNITED STATES PATENT OFFICE 2,428,517

TRACTOR COMBINE COMBINATION

Erwin Dunker, Hebron, Nebr.

Application September 9, 1943, Serial No. 501,700

4 Claims. (Cl. 74—217)

1

My invention relates to tractor drawn and driven combines, and has among its objects and advantages the provision of an improved arrangement of the two units wherein a novel driving connection is provided between the power take-off shaft of the tractor and the combine, together with a novel arrangement of the combine with respect to the tractor to facilitate one-man operation of the combination.

In the accompanying drawings:

Figure 1 is a top plan view of the combine and a portion of the tractor;

Figure 2 is a view taken from the position indicated by line 2—2 of Figure 1;

Figure 3 is a rear elevational view with a portion of the combine broken away for the purpose of illustration;

Figure 4 is a transverse sectional view;

Figure 5 is a side elevational view partly broken away of the grain cutting and elevating unit for delivering the cut grain to the thrasher unit;

Figure 6 is a view of a speed control for the cylinder shaft of the thrasher unit;

Figure 7 is a view of the opposite side of the structure of Figure 6;

Figure 8 is a sectional view of the structure of Figures 6 and 7;

Figure 9 is an enlarged sectional view taken along the line 9—9 of Figure 2;

Figure 10 is a perspective view of a grain moving platform;

Figure 11 is a perspective view of the power take-off mechanism; and

Figure 12 is a sectional view of a portion of the structure of Figure 11.

In the embodiment selected for illustration, I make use of a tractor 20 of any suitable conventional type for pulling the combine 22 located closely adjacent the rear end of the tractor. The unit 22 is provided with draw bars 24 having their forward ends pivotally mounted on the axle shafts 26 of the tractor. The cutter unit 28 of the combine is located closely adjacent to one side of the tractor 20.

Cutter unit 28 includes the usual sickle bar 30 and reel structure 32. Means for elevating the cut grain comprises an endless canvas 34 for dumping the grain onto a feeder pan 36 having a dump edge 38 arranged at about an angle of forty-five degrees to the longitudinal axes of the thrasher unit 40 of the combine and the cutter unit 28.

In Figure 5, the canvas 34 passes over rollers 42 and 44, and a crank 46 is fixedly secured to the roller 44 for pivotal connection with one end of a

2 link 48 having its other end pivotally connected at 50 with a flange 52 secured to the feeder pan 36. This feeder pan is mounted on oscillating links 54 for oscillation through reciprocatory motion of the link 48 imparted thereto through rotation of the roller 44. Grain pouring over the dump edge 38 falls upon an endless feeder drag or canvas 56 passing around rollers 58 and 60, see Figure 3. The thrasher cylinder is illustrated at 60, which cylinder is mounted on a shaft 62. Grain from the feeder drag 56 is delivered into the thrasher unit, the latter being of conventional construction so far as beaters, shakers and grain separation are concerned.

In Figure 1, the canvas 34 is driven through the medium of a bevel gear 64 meshing with a bevel gear 66 rotated through the medium of a chain driven sprocket 68. The reel 32 is driven through the medium of a sprocket 70 connected with a shaft 72 having universal joints 74 interposed therein and connected with a bevel gear 76 meshing with a bevel gear 78 attached to the reel shaft 80. A shaft 82 connects with the gear 66 and is provided with a crank 84 for operating the sickle knife.

The cylinder 60 is driven by a V-belt 86 passing around a grooved wheel 88 keyed to the shaft 62. Belt 86 passes around a grooved wheel 90, see Figure 8, comprising a flange 92 and a flange 94 mounted loosely on a sleeve 96. Sleeve 96 is formed integrally with the flange 92 and rotates freely on a shaft 98. A second flange 100 is formed integrally with the sleeve 96 and coacts with the flange 94 to provide a grooved wheel 102 for coaction with a V-belt 104 passing around a grooved wheel 106, see Figures 2 and 4. A second grooved wheel 108 is formed integrally with the grooved wheel 106 for connection with a V-belt 110 passing over a grooved wheel 112 which supplies power for the thrasher unit, the cylinder thereof being independently driven through the medium of the belts 86 and 104.

In Figures 2, 4, 11 and 12, the grooved wheels 106 and 108 are fixedly secured to a tube shaft 114 rotatably mounted in a bearing 116 on an upright tubular support 118 having a rod 120 slidable therein, which rod is attached to a frame member 122 on the thrasher unit. Shaft 114 is splined for longitudinal movement on the tractor power take-off shaft 124 having a universal joint 126 interposed therein. To the support 118 is fixedly connected a shaft 128 slidable in a bearing 130 fixed on a yoke 132 pivotally mounted at 134 to two supports 136 fixedly connected with the axle housing 138 of the tractor. The axes 134 are coaxial in line with the universal joint 126. The combine is pivotal in conformity with irregular earth contours about the axle shafts 26, and the shafts 114 and 128 are respectively slidable on the power take-off shaft 126 and in the bearing 130 to provide any necessary compensation for shifting of the parts incident to such pivotal motion and bending of the power take-off shaft at the universal joint 126. The yoke 132 pivots in line with the universal joint so as to freely accommodate relative vertical movement between the tractor and the combine as the machinery passes over uneven ground formations.

Means are provided for varying the speed of the cylinder of the thrasher. Such means comprise pinions 140 fixed to the shaft 98 of Figures 6, 7 and 8. A link 142 has its lower end pivotally mounted on the shaft 114 and its upper end is provided with parallel bars 144 and 146, each provided with parallel bearing supports 148 and 150. The bearing supports 150 are pivotally connected at 152 with the bars 144 and 146. Between the bearing supports 148 and 150 on the bar 146 is positioned a bearing block 154 of rectangular contour and in which one end of the shaft 98 is rotatably journaled. The bearing block 154 is held in position through tightening of a bolt 156 passing through the bearing supports 148 and 150.

The bearing supports 148 and 150 of the bar 144 are provided with bearing blocks 158 shaped to clamp upon the shaft 98 through tightening of a bolt 160. A crank 162 is provided at one end of the shaft 98 for rotating the pinions 140. Each of the bearing supports 148 is provided with a rack 164 meshing with one of the pinions 140.

A link 166 has one end pivoted on the cylinder shaft 62 and its other end provided with parallel bars 168 and 170, each provided with bearing supports 172 and 174 corresponding to the bearing supports 148 and 150. The bearing supports 174 are pivotally connected at 176 with their respective bars 168 and 170. Each set of bearing supports 172 and 174 is provided with a bearing such as that illustrated at 154, and each set is provided with a bolt 178 corresponding to the bolts 156. A rack 180 is also secured to each of the bearing supports 172 for respective engagement with the pinions 140.

Rotation may be imparted to the shaft 98 by unloosening the bearing blocks 158, such rotation imparting relative motion to the crossed links 142 and 166 to increase the distance between the axis of the shaft 98 and the axis of the shaft 114 and to decrease the distance between the axis of the shaft 98 and the axis of the cylinder shaft 62 when the shaft 98 is rotated in one direction. Rotation of the shaft in the opposite direction decreases the distance between the axes of the shafts 98 and 114 while increasing the distance between the axes of the shaft 98 and the cylinder shaft.

Since the flange 94 is floatingly mounted on the sleeve 96, the variable tension imparted to the belts 86 and 104 through rotation of the shaft 98 causes the flange 94 to shift axially on the sleeve 96 so as to correspondingly increase and decrease the relative diameters of the wheels 90 and 102. Thus the wheel diameters are automatically adjusted to vary the speed of the cylinder shaft through relative shifting of the links 142 and 166. A crank 182 is provided at one end of the shaft 98 to facilitate rotation thereof, which crank is located in close proximity to the operator seated on the tractor so that adjustments may be made by the operator.

Means are provided for adjusting the belts 86 and 104 with respect to tension. Each of the links 142 and 166 is made up of two sections 184 and 186 arranged in telescopic relationship and splined against relative rotation, as indicated at 188 in Figure 9. Figure 2 illustrates the two links in elevation, each section 184 being threaded at 190 for coaction with a nut 192 abutting its respective section 186, so that the length of the link may be adjusted through rotation of the nut.

The thrasher unit 40 is provided with a rearwardly extending frame 194 to which a caster wheel 196 is connected. The two draw bars 24 support the forward side of the thrasher unit while the caster wheel 196 supports the rear side. The cutter unit 28 is detachable from the thrasher unit along the line 198 of Figures 1 and 3, and the cutter unit is provided with a draw bar 200 which may be connected with a pin 202 on the frame extension 194, see Figure 4, so as to narrow the width of the machinery while being moved from place to place. The cutter unit is provided with a supporting wheel 204 at the grain side of the unit, and an auxiliary wheel 206 may be attached to the cutter unit when the latter is being towed. The grain bin 208 is mounted so as to counterbalance the cutter unit or header 28.

A header and thrasher combination having the tractor relationship illustrated is relatively easy to maneuver and operates so as to cut the field corners square and clean. The assembly embodies a relatively narrow transport width so as to eliminate many machine shed storage difficulties. The header follows the contour of the land to assure better work in extremely rough land and low cutting conditions. The bunches of unthrashed grain laid on the canvas 34 by the reel bats are fed headfirst to the cylinder of the thrasher. The power for operating the thrasher unit is delivered in a straight line from the power take-off shaft by simple and efficient V-belt drives. The operator on the tractor is positioned so as to observe the operation of the machine from the sickle to the grain tank. The cylinder speed may be changed from a position on the tractor while the machine is in operation. Since the tractor carries a considerable part of the combine weight, the combine will have fewer traction difficulties under muddy conditions.

Without further elaboration, the foregoing will so fully illustrate my invention, that others may, by applying current knowledge, readily adapt the same for use under various conditions of service.

I claim:

1. A variable speed drive for a tractor having an axle means and a power take-off shaft located rearwardly of the axle means and extending longitudinally of the tractor, comprising a universal joint interposed in said power take-off shaft, a first drive member, a second drive member, third and fourth drive members keyed to said power take-off shaft for rotation therewith but movable longitudinally thereon, a first endless drive means connecting said first drive member with said third drive member, and a second endless drive means connecting said second drive member with said fourth drive member.

2. A variable speed drive for a tractor comprising, a drive member carried by the tractor, a first belt connected with said drive member, a second belt connected with said drive member, coaxial pulleys adjustable for diameter and repectively connected with said first and second belts, a first link having one end mounted for pivotal movement about the axis of said drive member, a second link having one end mounted for pivotal movement about the axis of said drive member, said first and second links crossing at the axis of said adjustable pulleys, a shaft rotatably carried by said first and second links and constituting a support for said adjustable pulleys, pinions fixed to said shaft, and racks on the first and second links respectively meshing with said pinions to impart relative movement to the first and second links through rotation of said shaft and adjust said adjustable pulleys for diameter to vary the speed of the drive member.

3. The invention described in claim 2 wherein said coaxial pulleys comprise a sleeve rotatably mounted on said shaft and having belt-engaging flanges at its ends, and a third flange mounted for axial movement on said sleeve and located between said first-mentioned flanges, said first and second belts being of the V type, and all said flanges being angled for respective engagement with sides of the first and second belts, and said third flange shifting axially of said sleeve in response to increased tension in either the first or second belts.

4. The invention as in claim 1 wherein means are interposed in said second endless drive means for varying the speed of said second drive member, and wherein said first, second, third and fourth drive members, each comprises a grooved pulley and in which said first and second endless drive means comprise V-belts.

ERWIN DUNKER.

REFERENCES CITED

The following references are of record in the file of this patent:

UNITED STATES PATENTS

| Number | Name | Date |
| --- | --- | --- |
| 1,952,512 | Raney et al. | Mar. 27, 1934 |
| 2,017,755 | Hyman | Oct. 15, 1935 |
| 2,235,122 | Shaw | Mar. 18, 1941 |
| 2,314,259 | Welty | Mar. 16, 1943 |
| 2,253,921 | Van Sant | Aug. 26, 1941 |
| 2,198,471 | Benson | Apr. 23, 1940 |